Figure 1:
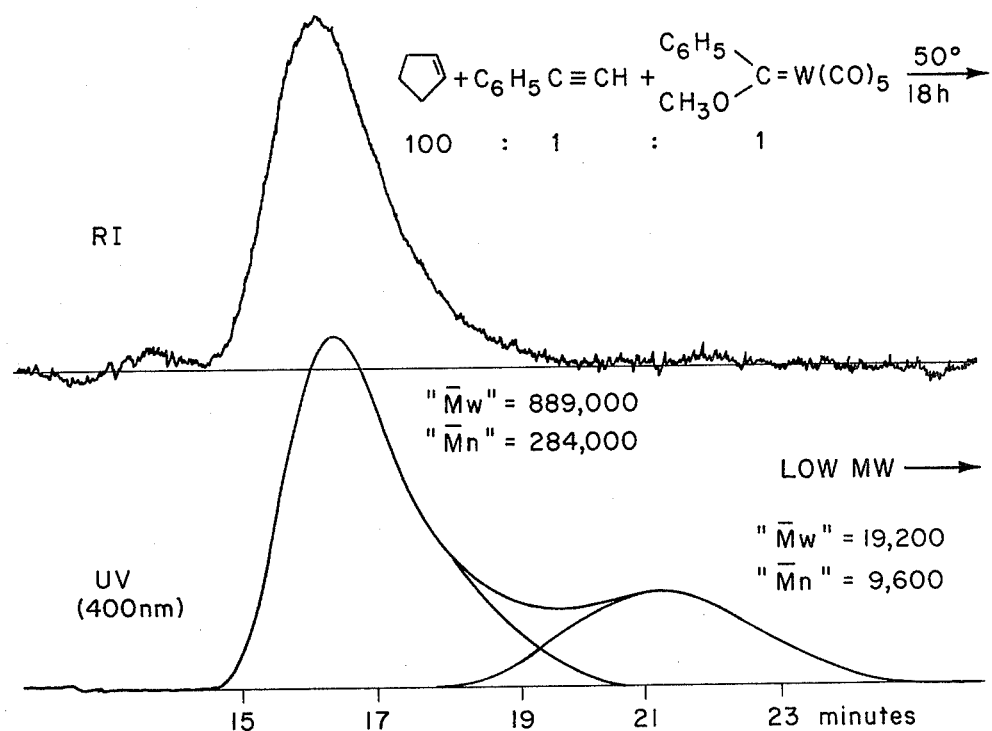

United States Patent [19]

Katz et al.

[11] 4,334,048

[45] Jun. 8, 1982

[54] OLEFIN METATHESIS

[75] Inventors: Thomas J. Katz, New York; Mridula Nair, Penfield; Steven J. Lee, New York, all of N.Y.

[73] Assignee: The United States of America as represented by the Secretary of the Navy, Washington, D.C.

[21] Appl. No.: 267,111

[22] Filed: May 26, 1981

[51] Int. Cl.³ ............................................... C08F 4/78
[52] U.S. Cl. ............................... 526/170; 252/431 R; 526/75
[58] Field of Search ............. 526/75, 170; 252/431 R

[56]  References Cited

U.S. PATENT DOCUMENTS

| | | | | |
|---|---|---|---|---|
| 3,463,827 | 8/1969 | Banks | | 526/170 |
| 3,474,117 | 10/1969 | Tedeschi | | 526/170 |
| 3,790,544 | 2/1974 | Maertens | | 252/429 C |
| 3,849,509 | 11/1974 | Streck | | 260/677 R |
| 3,935,179 | 1/1976 | Ofstead | | 252/429 B |
| 3,974,092 | 8/1976 | Streck | | 252/429 B |
| 3,974,094 | 8/1976 | Streck | | 252/429 B |
| 4,038,471 | 7/1977 | Castner | | 526/142 |
| 4,080,491 | 3/1978 | Kobayashi | | 526/137 |
| 4,172,932 | 10/1979 | Ofstead | | 526/142 |

OTHER PUBLICATIONS

T. J. Katz et al., "Preparations of Polymers Using Metal-Carbenes", J. Molecular Catalysis, vol. 8, May 27, 1980, pp. 219–226.

*Primary Examiner*—Paul R. Michl
*Attorney, Agent, or Firm*—R. S. Sciascia; P. C. Lall; A. P. Durigon

[57]  ABSTRACT

A process is described for the polymerization of cyclic olefins by ring-opening employing a coinitiator such as acetylene or substituted acetylenes. The polymers obtained by this method are highly stereoselective.

5 Claims, 3 Drawing Figures

OLEFIN METATHESIS

BACKGROUND OF THE INVENTION

This invention relates to a novel method for polymerizing olefins using acetylene as a coinitiator.

It is well known that cyclic olefins containing at least one ring double bond can be polymerized under ring opening conditions. The olefin metathesis reaction is shown by equations (1) and (2) below and uses unsaturated hydrocarbons.

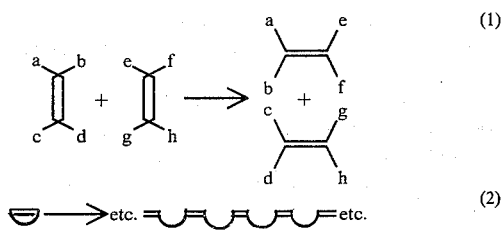

Such a reaction has been previously brought about by combining a variety of materials commonly containing tungsten, molybdenum, or rhenium, with organic derivatives of aluminum, tin, or sometimes other metals. However, these initiators also induce contaminating side-reactions and the polyalkenamers produced are stereochemically inhomogeneous. Similar procedures apply to and also constrain the metathesis of acyclic olefins such as cis-2-pentene. It is thus desirable to accomplish olefin metathesis where the double bonds in the polymer or the monomer obtained are stereochemically highly homogeneous.

SUMMARY OF THE INVENTION

According to the teachings of the subject invention olefin metathesis is accomplished by using appropriate amounts of acetylenes as a coinitiator whereby the double bonds in the polyalkenamers or the monomeric products that are formed are 94–97% cis.

An object of the subject invention is to use acetylenes as coinitiators to bring about olefin metathesis.

Another object of the subject invention is to accomplish olefin metathesis wherein the double bonds formed are introduced with high stereoselectivity.

Still another object of the subject invention is to have a method for obtaining polyalkenamers where the molecular weights of the polyalkenamer are regulated.

Other objects, advantages and novel features of the subject invention are accomplished by illustrating the following examples of the best mode of carrying out the invention. However, it should be clearly understood that these examples should not be construed as being limited on the scope or spirit of the invention. It should further be noted that according to the teachings of the subject invention acetylenes are effective coinitiators for olefin metathesis but only when used in optimum amounts.

EXAMPLE 1

Polymerization of cyclopentene

Cyclopentene 10 millimole (10 mmol) and phenylacetylene (0.1 mmol) each previously passed through short columns of basic alumina, were combined, degassed over calcium hydride, and distilled into an ampule containing (phenylmethoxycarbene)pentacarbonyltungsten (0.1 mmol). The ampule was sealed and heated at 50° C. for 17.5 hours. The ampule was broken and the contents were then dissolved at room temperature in methylene chloride. The polymer was precipitated with methanol, and this procedure was repeated at least three times. Drying in vacuum gave a pale-orange rubbery polymer (38% yield) identified by its infrared and $^{13}C$ NMR spectrum as polypentenamer whose double bonds are 58–85% cis.

As shown in the accompanying FIG. 1, its gel permeation chromatographic (GPC) analysis showed the polypentenamer has polyphenylacetylene units attached to it. This figure shows Gel-permeation chromatograms in toluene on $\mu$-styragel columns (exclusion limits $10^6$, $10^5$, $10^4$, $10^3$, 500 Å) of the polymer obtained from cyclopentene (100 equiv), phenylacetylene (x equiv), and (phenylmethoxycarbene)pentacarbonyltungsten (1 equiv) after 17.5 hours at 50° C. Analyses were by refractive index (top chromatogram) and by light absorption at 400 nm (bottom chromatogram). The molecular weights listed are those of polystyrenes that would exhibit the chromatograms observed. That polypentenamer and polyphenylacetylene units are linked is shown by the top chromatogram paralleling the bottom one. The molecular weights of the polypentenamer according to gel permeation chromatographic (GPC) analysis were $\overline{M}_w$ (weight average molecular weight) = 480,000, $\overline{M}_n$ (number average molecular weight) = 170,000 where $\overline{M}_w$ and $\overline{M}_n$ are defined as $\Sigma N_i M_i^2 / \Sigma N_i M_i$ and $\Sigma N_i M_i / \Sigma N_i$ respectively where $N_i$ is the number of polymer chains with mass $M_i$.

Similar experiments in which the amount of phenylacetylene used was varied and in which the reaction times were 21.5 hours gave polypentenamer in the yields and with the molecular weights summarized in Table 1 below:

| X | % yield polypentenamer | $\overline{M}_w \times 10^{-3}$ | $\overline{M}_n \times 10^{-3}$ |
| --- | --- | --- | --- |
| 3.0 | 4.9 | 178 | 66 |
| 2.25 | 4.2 | 262 | 83 |
| 1.75 | 7.0 | 333 | 119 |
| 1.0 | 15.8 | 348 | 100 |
| 0.75 | 20.3 | 594 | 289 |
| 0.3 | 36.7 | 674 | 340 |

In earlier experiments by Katz and Lee, no polypentenamer was observed to form after seven days when no phenylacetylene was present.

EXAMPLE 2

Polymerization of Cycloheptene

Figure 2:
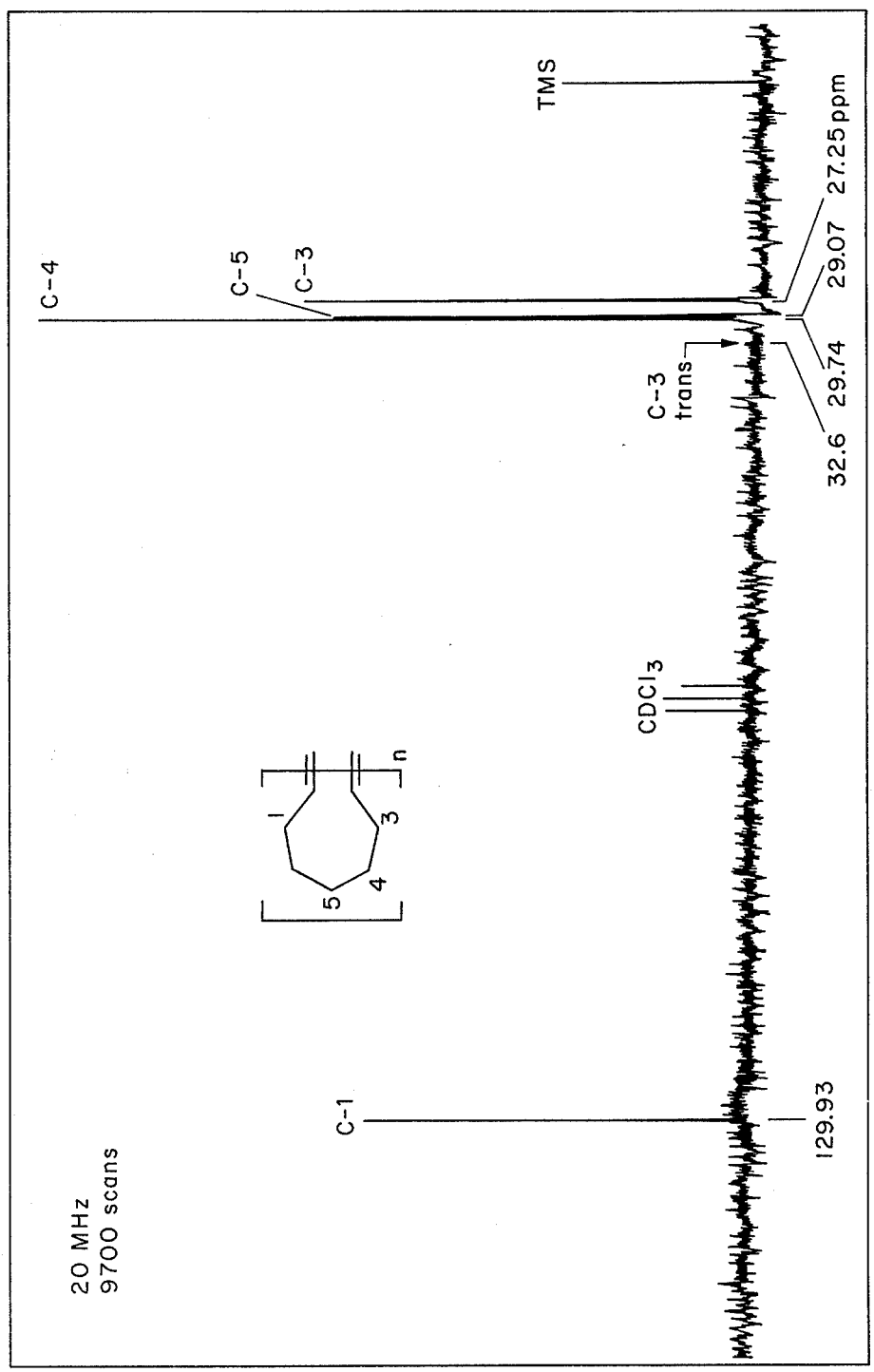

An experiment like the one in example 1 after 42 hours gave a 16% yield of polyheptenamer, analyzed by infrared (IR) spectroscopy to be 97% cis and by $^{13}C$ NMR spectroscopy to be greater than 93% cis. FIG. 2 shows $^{13}C$ NMR spectrum of polyheptenamer made from cycloheptene, phenylacetylene, and (phenylmethoxycarbene)pentacarbonyltungsten (molar ratios: 100,2,1). The solvent was CDCl$_3$. Note the absence of the resonance characteristic of the allylic methylene in the trans structure. The cis/trans ratio was measured by the ratio of the intensities of the infrared peaks at ca. 1400 and 960 cm$^{-1}$ [M. A. Golub, *J. Polym. Sci., Polym. Lett. Ed.*, 12, 295 (1974)]. The extinction coefficients, except that of cis-polyheptenamer which was found to be 9.0±0.5 1/mol cm, were those of C. Tosi, F. Ciampelli, and G. Dall'Asta, *J. Polym. Sci. Part A*-2, 11, 529 (1973). The GPC analysis showed the polyheptenamer's molecular weights to be $\overline{M}_w = 321,000$, $\overline{M}_n = 135,000$ and identified polyphenylacetylene units linked to it. In similar experiments in which the amounts of phenylacetylene were increased three-fold and ten-fold, the yields of polyheptenamer were 7.3% and 0% (undetectable by $^1$H NMR spectroscopy). When no phenylacetylene was used, no polyheptenamer was detected, even after 42 days.

EXAMPLE 3

Polymerization of Cyclooctene

Figure 3:
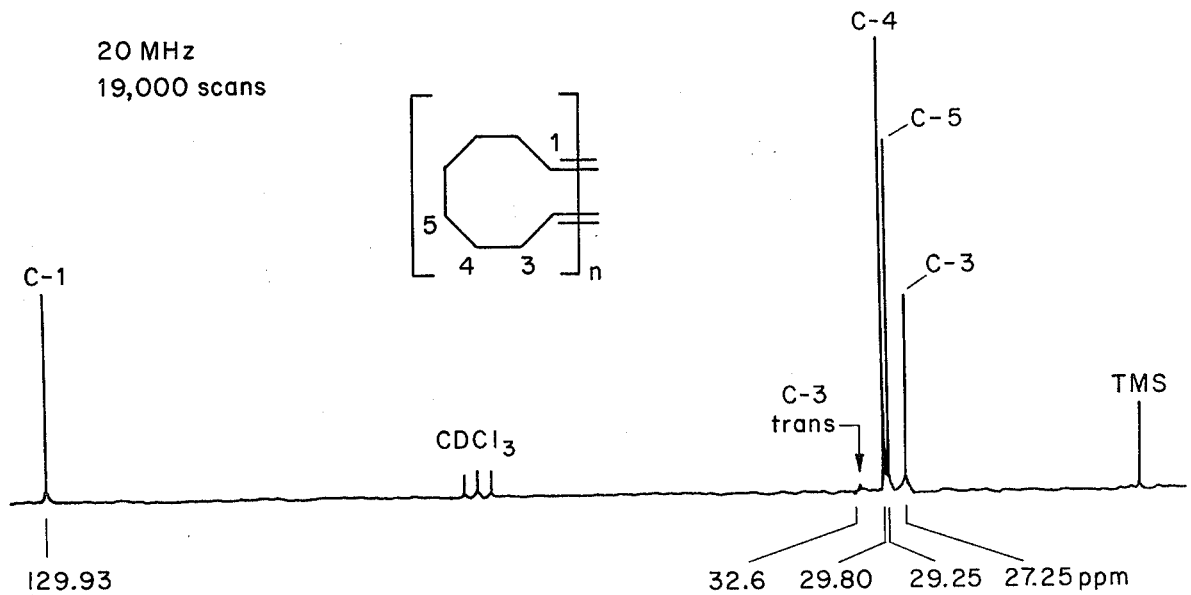

An experiment like that in example 1 after 3½ days gave an 8% yield of polyoctenamer, analyzed by IR spectroscopy to be 96% cis and by $^{13}$C NMR spectroscopy to be greater than 90% cis as shown in FIG. 3. FIG. 3 shows $^{13}$C spectrum in CDCl$_3$ of polyoctenamer made from cyclooctene, phenylacetylene, and (phenylmethoxycarbene) pentacarbonyltungsten. The GPC analysis showed polyoctenamers' molecular weights to be $\overline{M}_w = 281,000$, $\overline{M}_n = 147,000$ and identified polyphenylacetylene units linked to it.

EXAMPLE 4

Metathesis of cis-2-Pentene

Cis-2-Pentene (10 mmol) and phenylacetylene (0.1 mmol), each previously passed through short columns of basic alumina, were combined, degassed over calcium hydride, and distilled into an ampule containing (phenylmethoxycarbene)pentacarbonyltungsten (0.1 mmol). The ampule was sealed and heated at 50° C. for 7½ days. Distillation gave a liquid analyzed by vapor phase chromatography on 10 m×⅛" 5% TCEP on chromosorb P to contain 7.92±0.3 equivalents of 2-butene and 3-hexene per equivalent of cis-2-pentene. The 2-butene was 97±2% cis and the 3-hexene 93±2% cis.

A similar experiment in which the amount of phenylacetylene was increased three-fold gave 6.39±0.2 equivalents of 2-butene (97% cis) and 3-hexene (94% cis), and one in which the amount of phenylacetylene was increased ten-fold gave 1.79±0.1 equivalents of 2-butene (96% cis) and 3-hexene (92% cis). When no phenylacetylene was used the yield of butenes and hexenes was less tnan 0.5%. The preeceding examples can be reached with similar success by substituting generically or specifically described reactants under operating conditions of the invention for those used in the preceeding examples.

From the foregoing description, one skilled in the art can easily ascertain the essential characteristics of this invention and without departing from the spirit and scope thereof, can make various changes and modifications of the invention to adapt it to various usages and conditions. It is therefore understood that within the scope of the appended claims the invention may be practiced otherwise than as specifically described.

What is claimed is:

1. A process for polymerizing a cyclic or acyclic olefin to obtain a highly chemically homogeneous (stereoselective) polymer employing acetylene or substituted acetylene as a coinitiator which comprises the steps of:

reacting said olefin with phenylacetylene, both having been passed through short columns of alumina to obtain a mixture;

distilling said mixture into an ampule containing (phenylmethoxycarbene) pentacarbonyl tungsten and sealing the ampule;

heating the contents of said sealed ampule; and dissolving the contents of said sealed ampule in methylene chloride, and precipitating said highly chemically homogeneous polymer therefrom using methanol.

2. The process of claim 1 wherein said cyclic olefin is a member of the group containing cyclopentene, cycloheptene and cyclooctene.

3. The process of claim 1 wherein said acyclic olefin is cis-2-pentene.

4. The process of claim 1 wherein the amount of acetylene or substituted acetylene used as coinitiator varies from 0.3 equivalent to 1.0 equivalent.

5. The process of claim 4 wherein the weight average molecular weight and number average molecular weight varies inversely with the amount of acetylene or substituted acetylene used.

* * * * *